(12) United States Patent
Potts et al.

(10) Patent No.: US 6,435,565 B2
(45) Date of Patent: Aug. 20, 2002

(54) CLAMP FOR CLOSELY SPACED PIPES

(75) Inventors: Michael R. Potts, Troy; Michael E. Amedure, Lake Orion, both of MI (US)

(73) Assignee: BKS Company LLC, Birmingham, MI (US)

(*) Notice: Subject to any disclaimer, the term of this patent is extended or adjusted under 35 U.S.C. 154(b) by 0 days.

(21) Appl. No.: 09/908,521

(22) Filed: Jul. 18, 2001

Related U.S. Application Data

(60) Provisional application No. 60/219,096, filed on Jul. 18, 2000.

(51) Int. Cl.[7] .................................................. F16L 39/00
(52) U.S. Cl. ............................... 285/124.1; 285/124.2; 285/124.3; 285/124.4; 285/124.5; 285/120.1; 285/205; 285/236; 285/248; 285/364; 285/420; 285/FOR 118; 24/16 R; 403/389; 403/391; 403/396; 403/398
(58) Field of Search ............................ 285/124.1, 420, 285/205, 236, 248, 364, 120.1, 124.2, 124.3, 124.4, 124.5, FOR 118; 403/389, 391, 396, 398

(56) References Cited

U.S. PATENT DOCUMENTS

| | | | | |
|---|---|---|---|---|
| 1,441,054 A | * | 1/1923 | Barry | 285/154.3 |
| 1,519,018 A | * | 12/1924 | Boudreau | 285/124.2 |
| 1,615,092 A | * | 1/1927 | Longanecker | 52/696 |
| 1,708,470 A | * | 4/1929 | Eckert et al. | 403/391 |
| 2,012,562 A | * | 8/1935 | Gunn | 24/22 |
| 2,169,102 A | * | 8/1939 | Lemont | 403/389 |
| 2,354,919 A | * | 8/1944 | Lockwood | 248/68.1 |
| 2,592,791 A | | 4/1952 | Coberly | |
| 2,621,384 A | | 12/1952 | Slaughter | |
| 2,821,762 A | * | 2/1958 | Foose | 24/459 |
| 4,056,273 A | * | 11/1977 | Cassel | 285/337 |
| 4,361,935 A | | 12/1982 | Davis | |
| 4,629,226 A | * | 12/1986 | Cassel et al. | 285/382 |
| 4,790,574 A | * | 12/1988 | Wagner et al. | 285/419 |
| 4,799,641 A | * | 1/1989 | Koreski | 248/68.1 |
| 4,813,720 A | * | 3/1989 | Cassel | 285/419 |
| 4,817,897 A | * | 4/1989 | Kreusel | 248/68.1 |
| 4,875,716 A | * | 10/1989 | Winzen et al. | 285/137.1 |
| 5,172,877 A | * | 12/1992 | Hattori et al. | 248/68.1 |
| 5,271,646 A | * | 12/1993 | Allread et al. | 285/137.1 |
| 5,284,267 A | * | 2/1994 | Polletta et al. | 220/4.14 |
| 5,464,256 A | * | 11/1995 | Godeau | 285/26 |
| 5,588,680 A | * | 12/1996 | Cassel et al. | 285/3 |
| 5,860,677 A | * | 1/1999 | Martins et al. | 285/26 |
| 5,921,517 A | * | 7/1999 | Meuth | 248/230.8 |
| 5,931,423 A | * | 8/1999 | Heideloff | 248/74.4 |
| 5,941,483 A | * | 8/1999 | Baginski | 248/68.1 |
| 5,966,932 A | * | 10/1999 | Yahagi | 60/322 |

\* cited by examiner

*Primary Examiner*—B. Dayoan
*Assistant Examiner*—Carlos Lugo
(74) *Attorney, Agent, or Firm*—Reising, Ethington, Barnes, Kisselle, Learman & McCulloch, P. C.

(57) ABSTRACT

A band clamp is provided making a joint in each of two pairs of closely spaced pipes wherein the pipes in each pair are aligned with each other. The clamp has a single closed loop clamp band for connecting adjoining ends of the first pair to make a sealed joint and connecting the adjoining ends of the second pair of pipes to make a sealed joint. The clamp band encircles both pairs of pipes and overlaps a portion of the adjoining ends of both pairs of pipes. The closed loop of the clamp band has oppositely disposed concave lobe portions spanning the gap between the pipes and a clamping mechanism is provided for drawing the lobe portions toward each other for tightening the band around the adjoining ends of the pipes to provide a mechanical connection and a sealed joint in each pair of pipes.

8 Claims, 4 Drawing Sheets

CLAMP FOR CLOSELY SPACED PIPES

This application claims benefit of U.S. provisional application Ser. No. 60/219,096 filed Jul. 18, 2000.

FIELD OF THE INVENTION

This invention relates to pipe couplings and more particularly, it relates to a band clamp for making sealed joints in closely spaced pipes.

BACKGROUND OF THE INVENTION

There are various applications in which a pair of pipes are disposed in parallel, closely spaced relationship and each pipe requires a separate pipe extension to be coupled therewith. For example, in an engine exhaust system for a motorcycle, it is known to use a muffler which is provided with a pair of stub pipes extending from the end of the muffler body in closely spaced parallel relationship. In this arrangement, each stub pipe is coupled with another pipe as an extension of the conduit for the exhaust gases. In such an exhaust system, it is important to provide a sealed coupling or joint between each stub pipe and the associated pipe-extension which provides a high pull-apart strength and a good gas seal between the pipes. Preferably, the pipe joint should be easy to install and adapted for disassembly after it has been in use for a period of time.

The prior art shows various clamp arrangements for holding two or more hoses, pipes or other conduits in closely spaced parallel arrangements. The Gunn patent U.S. Pat. No. 2,012,562 granted Aug. 27, 1935 discloses a clamp or clasp for holding two flexible hoses in parallel arrangement. The Coberly patent U.S. Pat. No. 2,592,791 granted Apr. 15, 1952 and the Slaughter patent U.S. Pat. No. 2,621,384 granted Dec. 16, 1952 both disclose clamps for holding rigid pipes in closely spaced parallel arrangement. The Davis patent U.S. Pat. No. 4,361,935 granted Dec. 7, 1982 discloses a flexible banding strap and an associated lock ring for clamping a pipe and an electric cable in parallel arrangement. The Hattori et al. patent U.S. Pat. No. 5,172,877 granted Dec. 22, 1992 shows a clamp for holding two or more parallel pipes in a fixed relationship.

There is a need for a pipe clamp which can be used for making a joint between a first pair of pipes having adjoining free ends and a joint between a second pair of pipes having adjoining free ends and which will exhibit a good fluid seal and high pull-apart strength.

SUMMARY OF THE INVENTION

In accordance with this invention, a band clamp is provided for connecting a first pair of pipes having adjoining pipe ends to make a first sealed joint and for connecting a second pair of pipes having adjoining pipe ends to make a second sealed joint with the first and second pairs of pipes being disposed in side-by-side, closely spaced, axially parallel relation with a lateral gap therebetween. This is accomplished by a clamp band comprising a closed loop for encircling both the first and second pairs of pipes and having a width great enough to overlap a portion of the adjoining ends of the first and second pairs of pipes. The closed loop has first and second oppositely disposed concave lobe portions spanning the gap between the pipes and a clamping mechanism is provided for drawing the lobe portions toward each other for tightening the band around the adjoining pipe ends to provide a mechanical connection and sealed joint between the adjoining ends of the first pair of pipes and between the adjoining ends of the second pair of pipes.

Further, in accordance with the invention, the band clamp is provided with a clamping mechanism comprising first and second wedge-shaped spacers disposed respectively in said first and second lobe portions with each of the spacers having an apex pointed toward the gap between the pipes, and a threaded fastener extending through the spacers and the lobe portions and being operatively connected with the spacers whereby tightening of the fastener stretches the clamp band around the periphery of the first and second pairs of pipes to provide a mechanical connection and sealed joint between the adjoining ends of the first pair of pipes and between the adjoining ends of the second pair of pipes.

Further, in accordance with the invention, the clamping mechanism includes a reaction block disposed between the lobe portions and has a cross-sectional configuration which substantially fills the space bounded by said lobe portions and by the first and second pairs of pipes.

A complete understanding of this invention may be obtained from the detailed description that follows taken with the accompanying drawings in which:

BEST MODE FOR CARRYING OUT THE INVENTION

Figure 1:
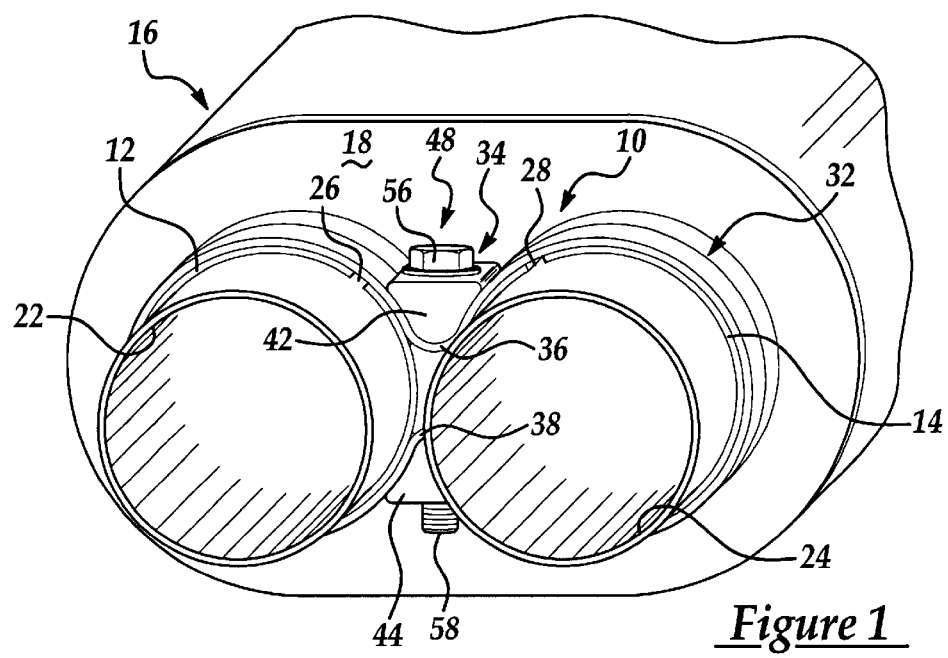
FIG. 1 is a perspective view of the band clamp of this invention as applied to twin pipes of a muffler in an exhaust system.

Referring now to the drawings, there is shown an illustrative embodiment of this invention in a pipe coupling especially adapted for connecting closely spaced stub pipes of a muffler to a respective pair of pipe-extensions in the exhaust system of a motorcycle engine. It will be understood as the description proceeds that this invention is useful in many other applications and may be realized in a variety of different embodiments.

Figure 2:
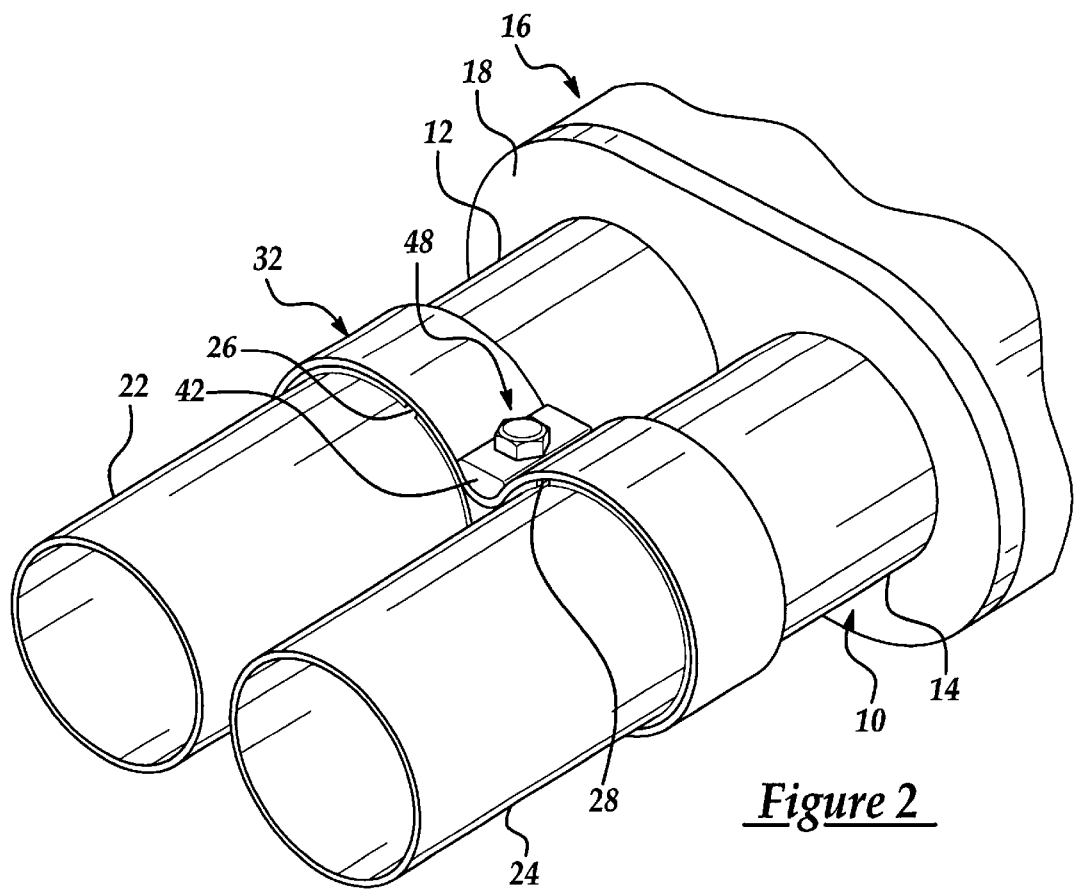
FIG. 2 is a different perspective view of the assembly of FIG. 1.
Figure 3:
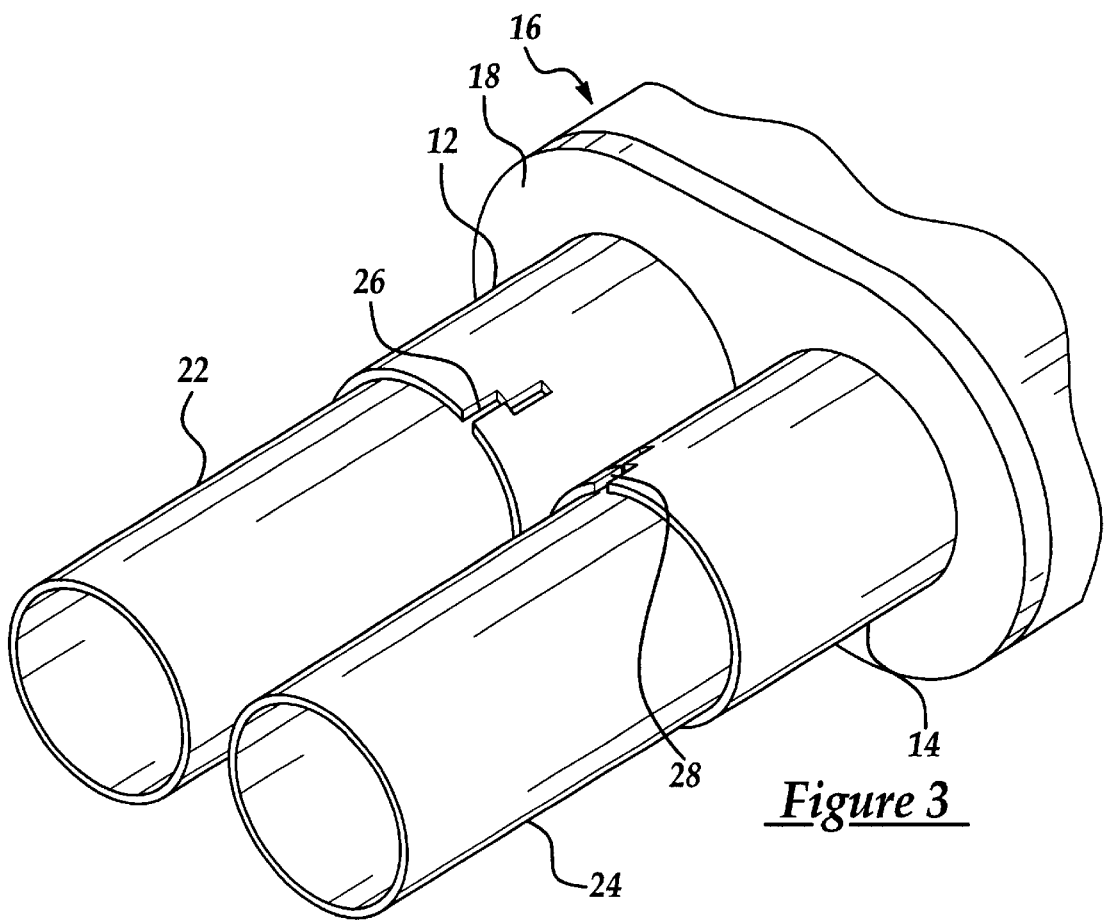
FIG. 3 is a view of the twin pipes of FIG. 1 before the band clamp is applied.

The band clamp 10 of this invention will now be described with reference to FIGS. 1, 2, 3, 4 5A and 5B. FIGS. 1 and 2 are different perspective views of the band clamp 10 installed on a pair of stub pipes 12 and 14 of a motorcycle engine muffler 16. The stub pipes 12 and 14 extend through the end wall 18 of the muffler 16 in closely spaced, parallel relationship. It is noted that the pipes 12 and 14 are cylindrical and of the same diameter and because of space constraints in the illustrative embodiment, the lateral gap or space between the pipes is only a small fraction of the pipe diameter. A pair of pipes 22 and 24, such as the tail pipes of the exhaust system, are connected by a lap joint or telescopic joint with the pipes 12 and 14, respectively. The pipes 22 and 24 are sometimes referred to herein as "pipe-extensions". In this joint, the free ends of pipe-extensions 22 and 24 are inserted into the free ends of stub pipes 12 and 14, respectively, with an overlap of the free ends. As described below, the outer pipe 12 is provided with at least one slot 26 and the outer pipe 14 is provided with at least one slot 28. The stub pipes 12 and 14 are sometimes referred to herein as "outer pipes" and the pipes 22 and 24 are sometimes referred to as "inner pipes".

Figure 4:
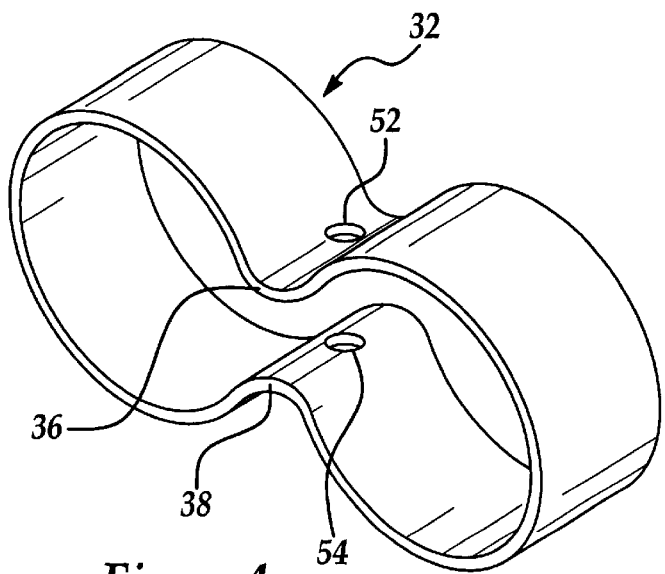
FIG. 4 is a view of the clamp band in an unstressed condition.

The band clamp 10 comprises, in general, a clamp band 32 and a clamping mechanism 34. As shown in FIG. 4, the clamp band 32 is a continuous band of metal preferably preformed in the general configuration of a figure-8. The clamp band 32 has sufficient peripheral length in its preformed condition to encircle the pipes 12 and 14 with enough clearance from the pipes to facilitate positioning the clamp band over the pipes. The clamp band spans the space between the pipes 12 and 14 with a pair of oppositely disposed concave lobes 36 and 38. The clamp band 32 is wide enough in the axial direction of the pipes 12 and 14 and the pipe-extensions 22 and 24 so that it overlaps a portion of the free ends of the pipes and pipe-extensions. In the preformed state of the clamp band 32, it is provided with a pair of bolt holes; one of the bolt holes 52 is provided at the central location in a first lobe portion 36 and the other bolt hole 54 is provided at a central location in the second lobe portion 38 so that the two bolt holes are aligned with each other in a direction perpendicular to a plane defined by the axes of the pipes 12 and 14.

The clamping mechanism 34 comprises, in general, a pair of force bars or spacers 42 and 44 and a bolt 48; optionally, the clamping mechanism also includes a reaction member or block 46, as described below.

The spacers 42 and 44 are suitably constructed of steel in a wedge or V-shaped cross-sectional configuration each having an axial length approximately equal to the width of the clamp band 32. The spacer 42 is provided with a transversely extending bolt hole (not shown) which is positioned for alignment with bolt holes 52 and 54 in the lobes 36 and 38 of the clamp band. The bolt 48 has a head 56 and a threaded shank 58. The spacer 44 is provided with a threaded bolt hole (not shown) and serves as a nut; however, a separate nut can be used if desired. The bolt shank 58 extends through the bolt hole in spacer 42, the bolt holes 52 and 54 in the lobe portions 36 and 38 and into threaded engagement with the bolt hole in the spacer 44.

The reaction block 46, as mentioned above, may be optionally used when desired for a particular installation of the band clamp. For example, it may be used to prevent buckling of the outer pipes 12 and 14 in the region between the lobes 36 and 38 of the clamp band 32. The reaction block is preferably constructed of steel and has a configuration which fills substantially all of the space bounded by the first and second lobes 36 and 38 and the wall portions 62 and 64 of the outer pipes 12 and 14, respectively. As shown, the reaction block 46 has oppositely disposed sidewalls 66 and 68 which are of circular curvature the same as that of the outer pipes 12 and 14 and it has oppositely disposed sidewalls 72 and 74 having a curvature corresponding with that of the apex of the spacers 42 and 44.

As described above, each of the outer pipes (stub pipes) 12 and 14 is provided with slots 26 and 28, respectively. Preferably, the outer pipes 12 and 14 are provided, respectively, with second slots 26 and 28 which are located on the pipes adjacent the lower end of the clamping mechanism 34. These slots are effective to minimize buckling of the pipe-wall when the clamping mechanism 34 is tightened to collapse the outer pipe 12 against the inner pipe 22 and to collapse the outer pipe 14 against the inner pipe 24. The slots 26 and 28 are located close to the upper end of the clamping mechanism 34 to minimize the buckling forces on the outer pipe in the vicinity of the clamping mechanism. The slots 26 and 28 are suitably of the construction as described in Cassel U.S. Pat. No. 4,629,226 granted Dec. 16, 1986 and U.S. Pat. No. 5,588,680 granted Dec. 31, 1996, the disclosure of which is hereby incorporated by reference.

Figure 5A:
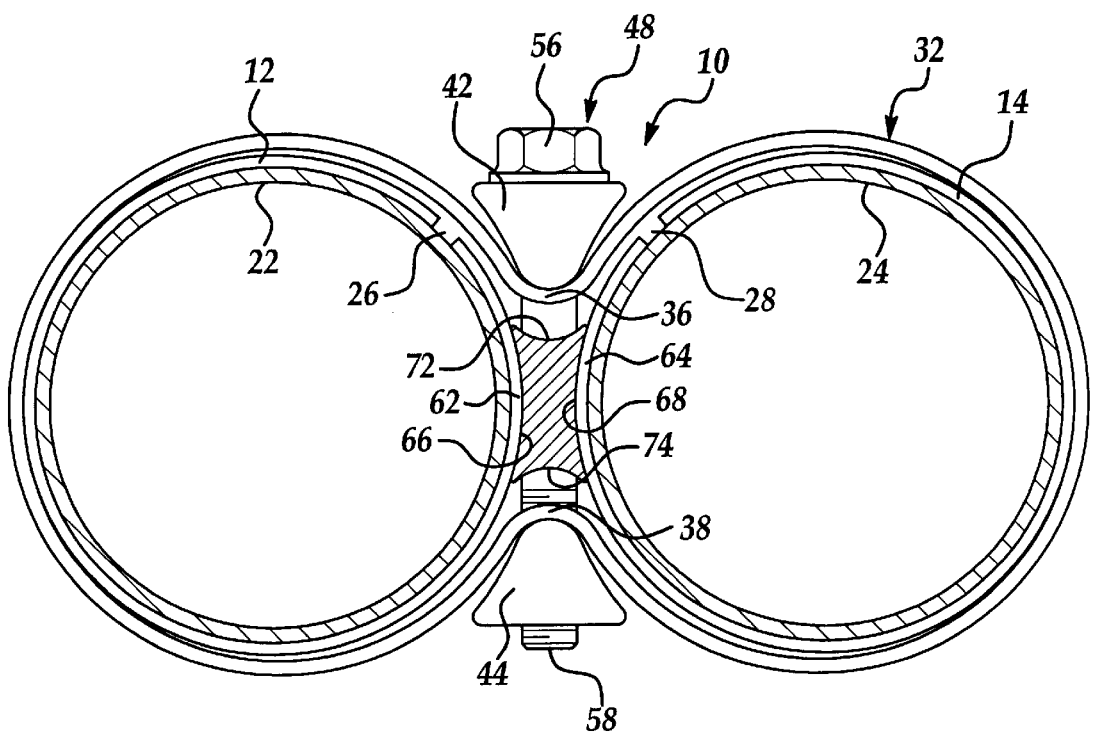
FIG. 5A is a cross-sectional view of the band clamp in its loosely assembled condition in position on the pipes before the clamp is tightened.
Figure 5B:
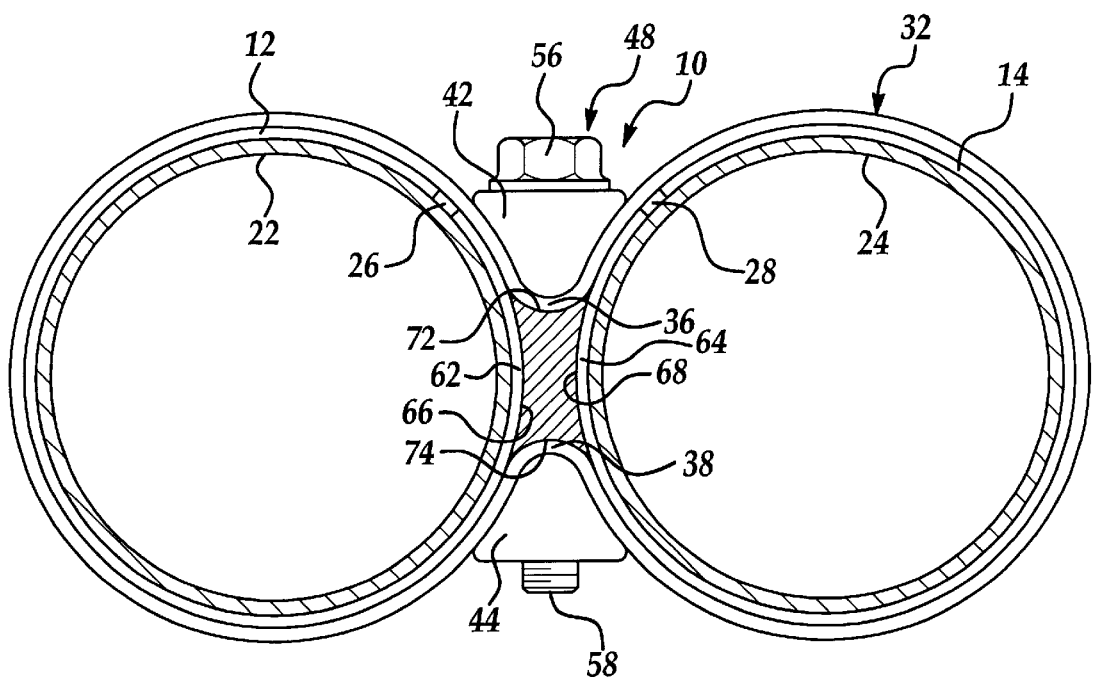
FIG. 5B shows the assembly of FIG. 5A after tightening the clamp.

In use of the band clamp 10 of this invention, as described above, the loosely assembled clamp is initially located over the ends of pipes 12 and 14 as depicted in FIG. 5A. After placing the clamp 10 in position, the inner pipes 22 and 24 are inserted into the outer pipes 12 and 14 so that the clamp is ready for tightening. When the bolt 48 is tightened, the clamping mechanism 34 is effective to stretch the clamp band 32 over the outer pipes 12 and 14 and thereby circumferentially collapse the outer pipes into tight fitting engagement with the inner pipes 22 and 24.

The spacers 42 and 44 have a convex configuration which is substantially V-shaped and facilitates a deep penetration of the clamp band into the space between the pipes thereby providing more extensive wrap-around of the clamp band 32 over the outer pipes 12 and 14.

Figure 6:
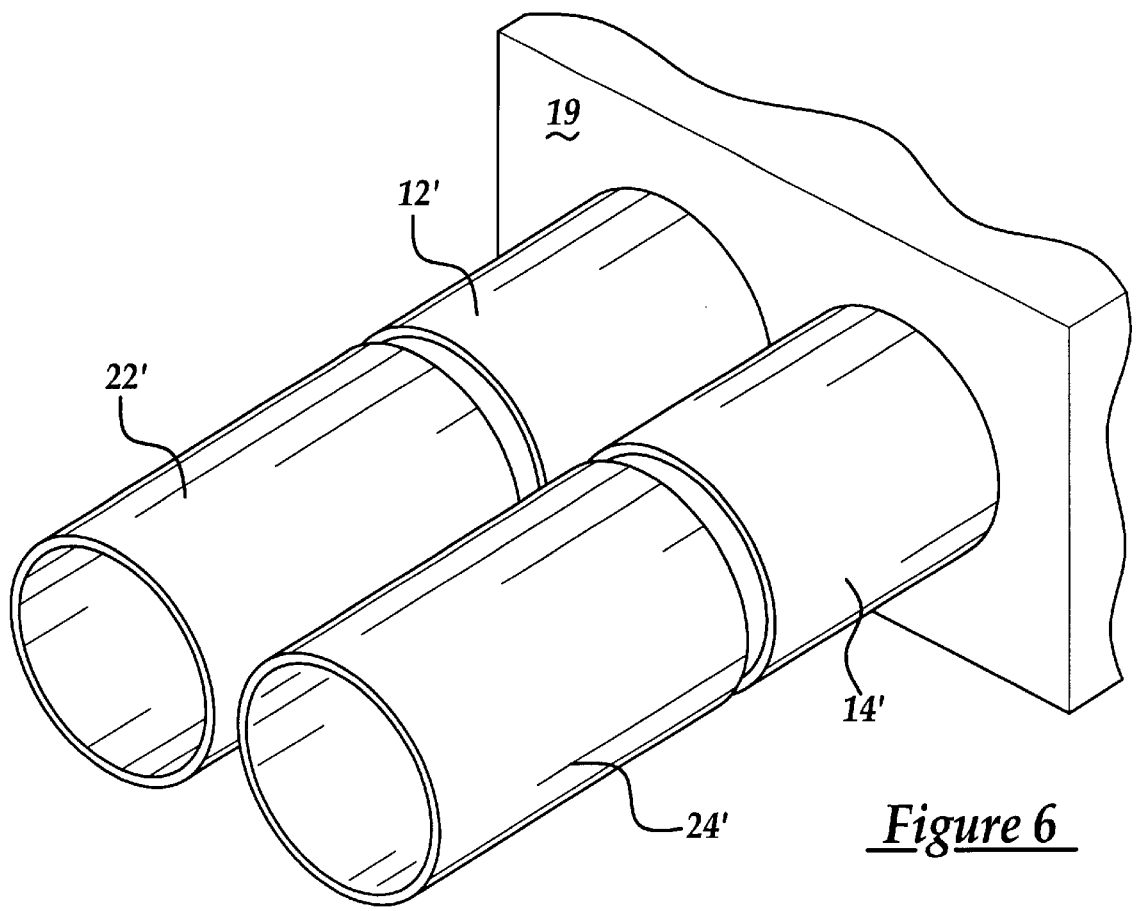
FIG. 6 shows a modification of the band clamp.

The band clamp 10 described above is useful in various applications other than engine exhaust systems and other than fluid conduit system. For example, the band clamp 10 as described above is also useful in making structural pipe joints for constructing scaffolds and the like. In such applications, the band clamp 10 is useful for making a butt joint of the pipes which exhibits a high pull-apart strength. In such an application of the invention, the band clamp is used to make first and second butt joints between adjoining ends of a first pair of pipes and the adjoining ends of a second pair of pipes. FIG. 6 shows a frame member 19 supporting side-by-side, closely spaced cylindrical stub pipes 12' and 22' and corresponding pipe-extensions 22' and 24'. The adjoining ends of pipes 12' and 22' are disposed in a butt joint relationship and the adjoining ends of pipes 14' and 24' are disposed in a butt joint relationship. The band clamp 10 as described with reference to FIGS. 1, 2, 3, 4, 5A and 5B is applied in the same manner as described above to make a first butt joint between the adjoining pipe ends of the first pair of pipes 12' and 22' and to make a second butt joint between the adjoining ends of the second pair of pipes 14' and 24'.

Figure 7:
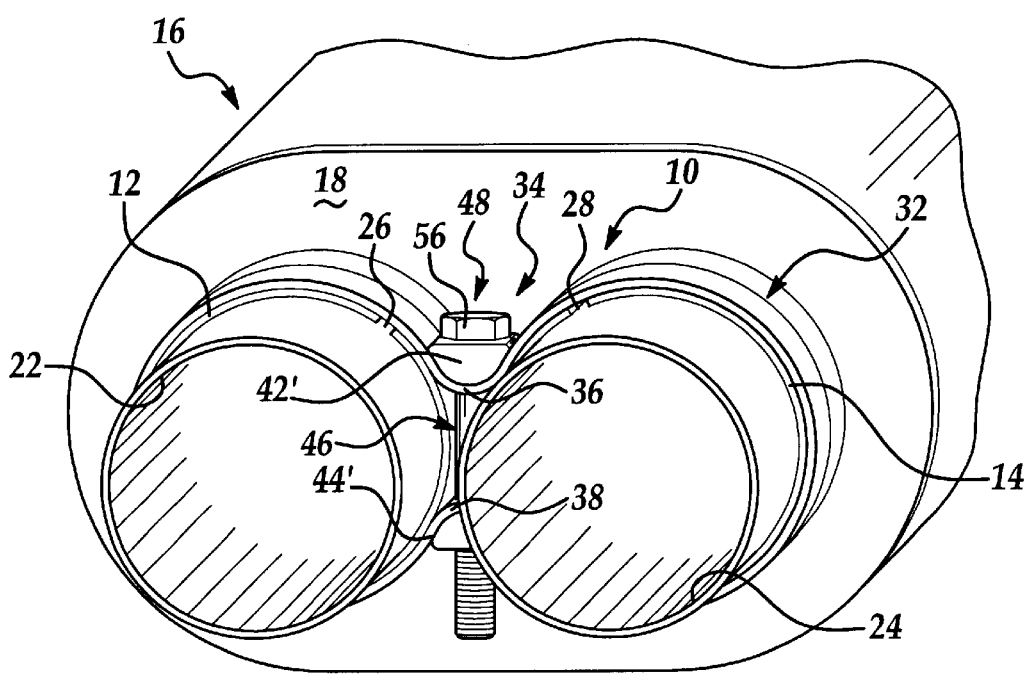
FIG. 7 shows another modification of the band clamp.

A modification of the invention is shown in FIG. 7. In this modification, the spacers 42' and 44' have a cross-section of approximately semi-cylindrical configuration as distinguished from the previously described V-shaped configuration. The semi-cylindrical configuration is especially useful where the gap between the first and second pairs of pipes is large enough to permit sufficient penetration of the lobes into the gap so that the clamp band can wrap-around provides the desired mechanical strength and sealing properties of the joint. Depending upon the application, the clamp band 10 of FIG. 7 can be used with or without a reaction member for either a lap joint or a butt joint.

Although the description of this invention has been given with reference to a particular embodiment, it is not be construed in a limiting sense. Many modifications and variations of the invention will now occur to those skilled in the art.

What is claimed is:

1. A band clamp for connecting a first pair of axially aligned cylindrical pipes having adjoining pipe ends to make a first sealed joint therebetween and for connecting a second pair of cylindrical axially aligned pipes having adjoining pipe ends to make a second sealed joint therebetween, said first and second pairs of pipes being disposed in side-by-side, closely spaced, axially parallel relation with a lateral gap therebetween, said band clamp comprising:

a clamp band comprising a closed loop encircling both said first and second pairs of pipes, said clamp band being wide enough to overlap a portion of said adjoining ends of said first and second pairs of pipes, said closed loop having first and second oppositely disposed concave lobe portions spanning the gap between said first and second pairs of pipes, clamping mechanism for tightening the clamp band around the periphery of said pipes, said clamping mechanism comprising first and second wedge-shaped spacers disposed respectively in said first and second lobe portions of said clamp band, each of said spacers having an apex pointed inwardly of said gap between the pipes, and a threaded fastener extending through said spacers and the opposite sides of said clamp band and operatively connected with said spacers whereby tightening of said threaded fastener stretches said clamp band around the periphery of said first and second pairs of pipes to provide a mechanical connection and sealed joint between the adjoining pipe ends of the first pair of pipes and a mechanical connection and a sealed joint between the adjoining pipe ends of the second pair of pipes.

2. The invention as defined in claim 1 wherein said first pair of pipes have adjoining telescoping ends to make a first sealed lap joint and said second pair of pipes have adjoining telescoping ends to make a second sealed lap joint therebetween.

3. The invention as defined in claim 1 wherein said first pair of pipes have adjoining abutting ends to make a first sealed butt joint and wherein said second pair of pipes have adjoining abutting ends to make a second sealed butt joint therebetween.

4. The invention as defined in claims 1, 2 or 3 wherein said clamping mechanism includes a reaction block disposed between said adjoining pipe ends of the first pair of pipes and the adjoining pipe ends of the second pair of pipes limits the spacing between first and second pairs of pipes, said reaction block having first and second opposed lateral concave seating surfaces disposed opposite said first and second pairs of pipes, respectively, said first and second seating surfaces having a configuration corresponding with the configuration of said first and second pairs of pipes.

5. The invention as defined in claim 4 wherein said reaction block has first and second oppositely disposed concave seating surfaces disposed opposite said first and second lobe portions, respectively, said first and second concave seating portions having a configuration corresponding with the configurations of said first and second wedge-shaped spacers, respectively.

6. The invention as defined in claim 1 wherein said wedge-shaped spacers have a V-shaped configuration.

7. The invention as defined in claim 1 wherein said wedge-shaped spacers have a semi-cylindrical configuration.

8. The invention as defined in claim 1, 2 or 3 wherein said clamping mechanism includes a reaction block which has a configuration in cross-sction which substantially fills the space surrounded by said first and second lobe portions and said adjoining pipe ends of the first and second pairs of pipes.

\* \* \* \* \*